United States Patent [19]

Belfort

[11] Patent Number: 5,626,758
[45] Date of Patent: May 6, 1997

[54] COILED MEMBRANE FILTRATION SYSTEM

[75] Inventor: Georges Belfort, Slingerlands, N.Y.

[73] Assignee: Rensselaer Polytechnic Institute, Troy, N.Y.

[21] Appl. No.: 512,567

[22] Filed: Aug. 8, 1995

[51] Int. Cl.$^6$ ................................................. B01D 69/04
[52] U.S. Cl. ................................... 210/636; 210/321.69
[58] Field of Search ....................... 210/321.83, 321.87, 210/636, 321.69

[56] References Cited

U.S. PATENT DOCUMENTS

| | | | |
|---|---|---|---|
| 3,647,521 | 3/1972 | Tulin. | |
| 3,784,470 | 1/1974 | Richardson et al. | 210/321.87 |
| 4,036,760 | 7/1977 | Bardonnet et al. | 210/321.87 X |
| 4,311,589 | 1/1982 | Brumfield | 210/177 |
| 5,202,023 | 4/1993 | Trimmer | 210/321.8 |
| 5,204,002 | 4/1993 | Belfort et al. | 210/634 |
| 5,311,932 | 5/1994 | Sen et al. | 165/109.1 |

FOREIGN PATENT DOCUMENTS

| | | |
|---|---|---|
| 2268096 | 5/1994 | United Kingdom. |
| WO90/09229 | 8/1990 | WIPO. |

OTHER PUBLICATIONS

Ionic Processes, vol. 2 —Athens, 1970 —Editors: A Delyannis and E. Delyannis, pp. 587–600.

Article in Journal of Membrane Science, 80 (1993: pp. 35–47, Authros, H. Winzeler & G. Belfort.

Article in Medical & Biol. Eng/Comput., 1977, 15., 106–117, Authors U. Baurmeister, D. James & W. Zingg.

Amer. Soc. for Artificial Internal Organs, vol. XXI, pp. 215–223, Wash. DC, Apr. 17–19, 1975.

"Linear and Helical Flow . . . " Dasgupta, Anal. Chem. 1984, 56, 96–103.

"Ion Chromatographic Separation . . . " Dasgupta, Anal. Chem. 1984, 56, 769–972.

"Micro Column Ion . . . " Rokushika et al., J. Chromat, 260 (1983) 81–87.

*Primary Examiner*—Frank Spear
*Attorney, Agent, or Firm*—Notaro & Michalos

[57] ABSTRACT

A method and apparatus for achieving reverse osmosis, microfiltration, nanofiltration and ultrafiltration, produces Dean vortices against a membrane surface which is advantageously in a form of a wound helical membrane tube.

13 Claims, 15 Drawing Sheets

COILED MEMBRANE FILTRATION SYSTEM

FIELD AND BACKGROUND OF THE INVENTION

The present invention relates in general to filtration modules or elements, and in particular to a new and useful method and apparatus which utilizes a curved or coiled tubular membrane constructed to maximize the formation of Dean vortices at the solution-membrane interface, for improving the filtration effect.

Most modular designs for pressure-driven membrane processes, such as reverse osmosis, ultrafiltration and microfiltration are based on maximizing membrane area per unit volume and on the handling convenience of the module. Many methods exist for reducing CP and fouling, including chemical modification of the membrane surface and physical methods such as scouring. Hydrodynamic methods are also known which rely on eddies during turbulent flow, or induced flow instabilities. Such instabilities can be created by introducing inserts into the flow path. Unstable flow across membranes have also been utilized to reduce solute build-up at the solution-membrane interface, by the inventor of the present application. See Belfort, G., "Fluid mechanics in membrane filtration: recent developments", *J. Membrane Sci.*, 40, 123–147 (1989).

Different types of instabilities have been used including vortices and instabilities resulting from rough membrane surfaces, flow pulsations and oscillating membrane surfaces. In addition to rough membrane surface, etc., instabilities have also been induced by a rotating disc system developed (i) in the 1970's by Fred Littman and Jerry Croopnick at Dresser Industries, TX and before that at Stanford Research Laboratories, CA and (ii) in the 1990's by Brown Boveri Co. in Malmo, Sweden. One of the most successful depolarizing methods has used Taylor vortices established in a rotating annular filter module. The main limitations of this design are the difficultly in scaling-up membrane area and high energy consumption. Vortices have also been produced in membrane-lined channels by frequently reversing turbulent flow (at 8 Hz) in a corrugated channel. See, Stairmand, J. W. and Bellhouse, B. J., "Mass transfer in a pulsating turbulent flow with deposition into furrowed walls," *Int. Heat Mass Transfer*, 27, 1405 (1985). This has also been done by forcing the fluid to flow around in a spiral half-cylinder channel over a flat membrane. See PCT patent application WO 90/09229 of Aug. 23, 1990 to Winzeler. Both of these approaches show increased performance in the presence of vortices, but each has experienced some difficulties including scale-up and sealing problems. The use of spacers in a spiral wound unit to induce mixing has been widely recommended. Unfortunately, at low axial Reynolds numbers typically used in Poiseuille flow for most spiral wound units, this approach has been largely ineffective. See the spiral flow filters of Toray Industries, Inc., disclosed, for example, in their brochure entitled Romembra Toray Reverse Osmosis Elements.

The effective use of fluid instabilities, such as vortices, in depolarizing and cleaning synthetic membranes for pressure-driven membrane applications has been widely confirmed in the literature. See Winzeler, H. B. and Belfort, G. (1993), Enhanced performance for pressure-driven membrane processes: The argument for fluid instabilities, J. Membrane Sci., in 80, 35–47. The present invention has shown excellent flux improvements in the presence of Dean vortices resulting from flow around a curved duct with microfiltration membranes. See U.S. Pat. No. 5,204,002, which is incorporated here by reference. An object of the present invention is to provide for such controlled vortices to be used to depolarize salt, macromolecules and suspensions in high pressure reverse osmosis (RO), ultrafiltration (UF), microfiltration (MF) or nanofiltration (NF) membrane processes.

SUMMARY OF THE INVENTION

The present invention is an apparatus for, and method of establishing vortices, in particular, Dean vortices, resulting from the onset of unstable flow in a curved path.

The invention includes using Dean vortices to defoul, i.e. remove deposits, and depolarize, i.e. remove suspended dissolved matter near the membrane, solutes away from membrane surfaces. The invention also includes a spiral or otherwise wound membrane tube for use in:

(i) reverse osmosis—mainly used for retention of salt and low molecular weight organics;

(ii) nanofiltration—mainly used for fractionation of salt and low molecular weight organics;

(iii) ultrafiltration—mainly used for fractionation of medium molecular weight organics and transport of salt and low molecular weight organics;

(iv) microfiltration—mainly used for retention of colloids, small particles, and transport of salt, low molecular weight organics and other dissolved organics and solutes.

The Dean vortex flow of the invention not only has similar advantages as Taylor vortex and oscillating flows but also is amenable to scale-up.

To practice one example of the invention, it was necessary to experimentally determine the effective and optimum range of Dean vortex depolarization for NF; to design, build and test simple prototype vortex generating tubular NF element; to use NMR imaging methods to verify the existence and persistence of vortices; and to solve the convective-diffusion equations for fast Dean flows with variable wall flux and variable parameter properties and use this model for predictive purposes. Concentration profiles within a vortex as a function of axial distance was used to estimate the effectiveness of this approach. This research strengthens our knowledge of how to produce vortex instabilities and how to use them to diminish concentration polarization.

Accordingly, one object of the present invention is to provide a method of defouling and depolarizing a solute from a membrane surface, comprising: providing the solute in a fluid solution adjacent the membrane surface; and producing Dean vortices in the fluid solution which move across the membrane surface, to defoul and depolarize the solute away from the membrane.

A further object of the invention is to provide an apparatus for reverse osmosis (RO), microfiltration (MF), nanofiltration (NF) and ultrafiltration (UF) processes, comprising: a wound membrane tube; and means for supplying a fluid through the tube for subjecting at least one component of the fluid to reverse osmosis, nanofiltration, microfiltration or ultrafiltration, through the membrane tube.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

The circumstances under which vortices appear in curved channel flow have been determined by Dean, W. R., "Fluid motion in a curved channel", Pro. Roy. Sco A 121 (1928) 402–420. The appearance of vortices depends on the velocity of the fluid characterized by a Reynolds number and the ratio of the inner and the outer radii of the curved channel. An equation relating the critical Reynolds number to the ratio of radii has been given by Reid for the narrow gap theory:

$$Re_c = \frac{\kappa}{2} \sqrt{\frac{\eta}{1-\eta}} \qquad (1)$$

where $\eta$ is the ratio of the inner radius $r_i$ and the outer radius $r_o$ of a curved channel and $\kappa_s$+35.94. See Reid, W. H., "On the stability of viscous flow in a curved channel", Proc. Roy. Sco. A, 244 (9158) 186–198.

Figure 1:
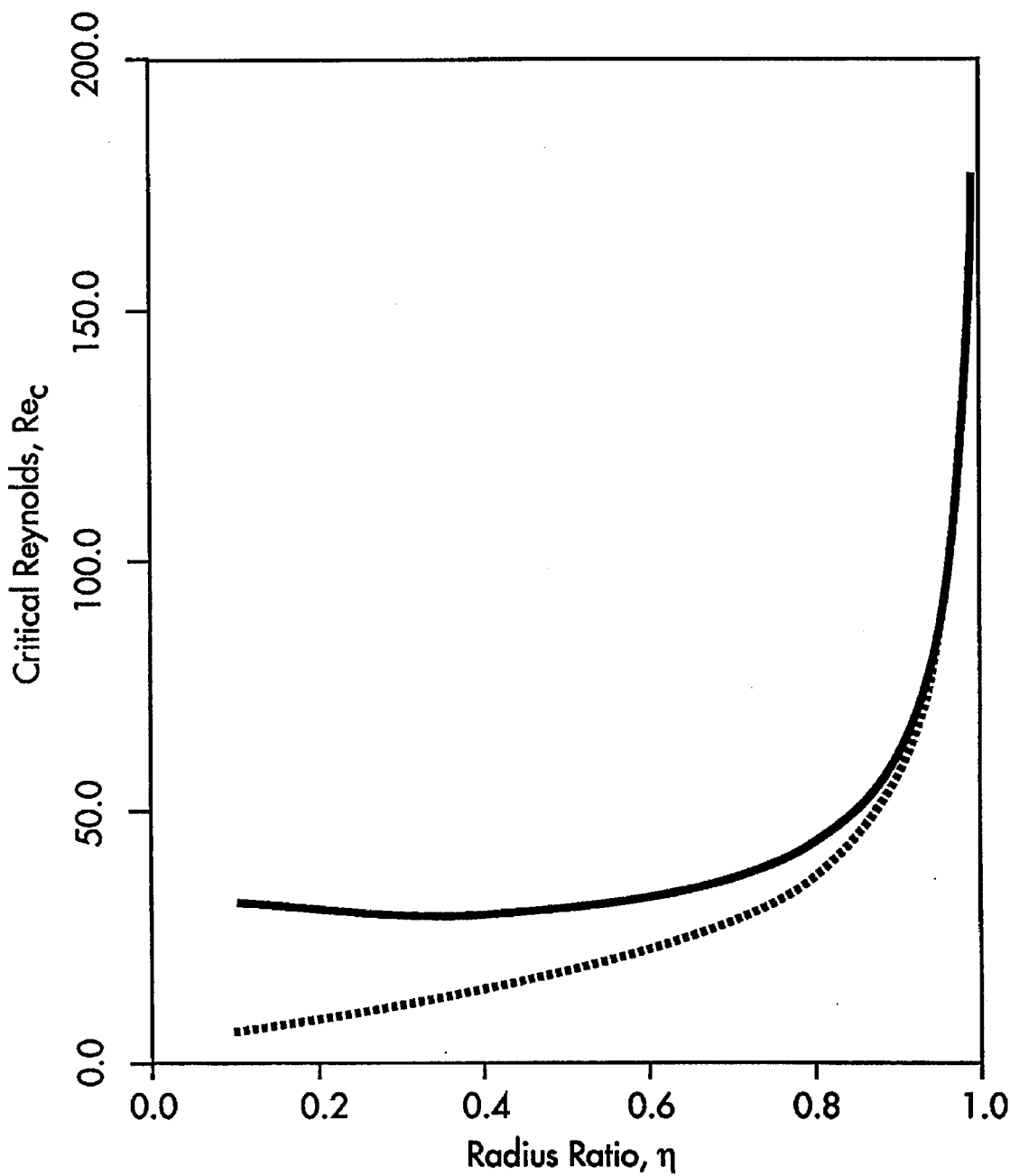
FIG. 1 is a graph plotting radius ratio against critical Reynolds number for a narrow gap theory shown in dashed line and a wide gapped theory shown in solid line.

In U.S. Pat. No. 5,204,002, the linear and weakly non-linear stability analysis for $Re_c$ for the wide-gap theory was disclosed. The results of the two theories are shown in FIG. 1. Both have been derived for a curved slit. However, they are based on Dean's equations which do not specify channel geometry. For the present invention, assume an appropriate fit of the narrow gap theory for a curved tube. FIG. 1 reveals that the narrow gap theory (dashed line) is a good approximation of the wide gap result (solid line) when $\eta > 0.90$.

Figure 2:
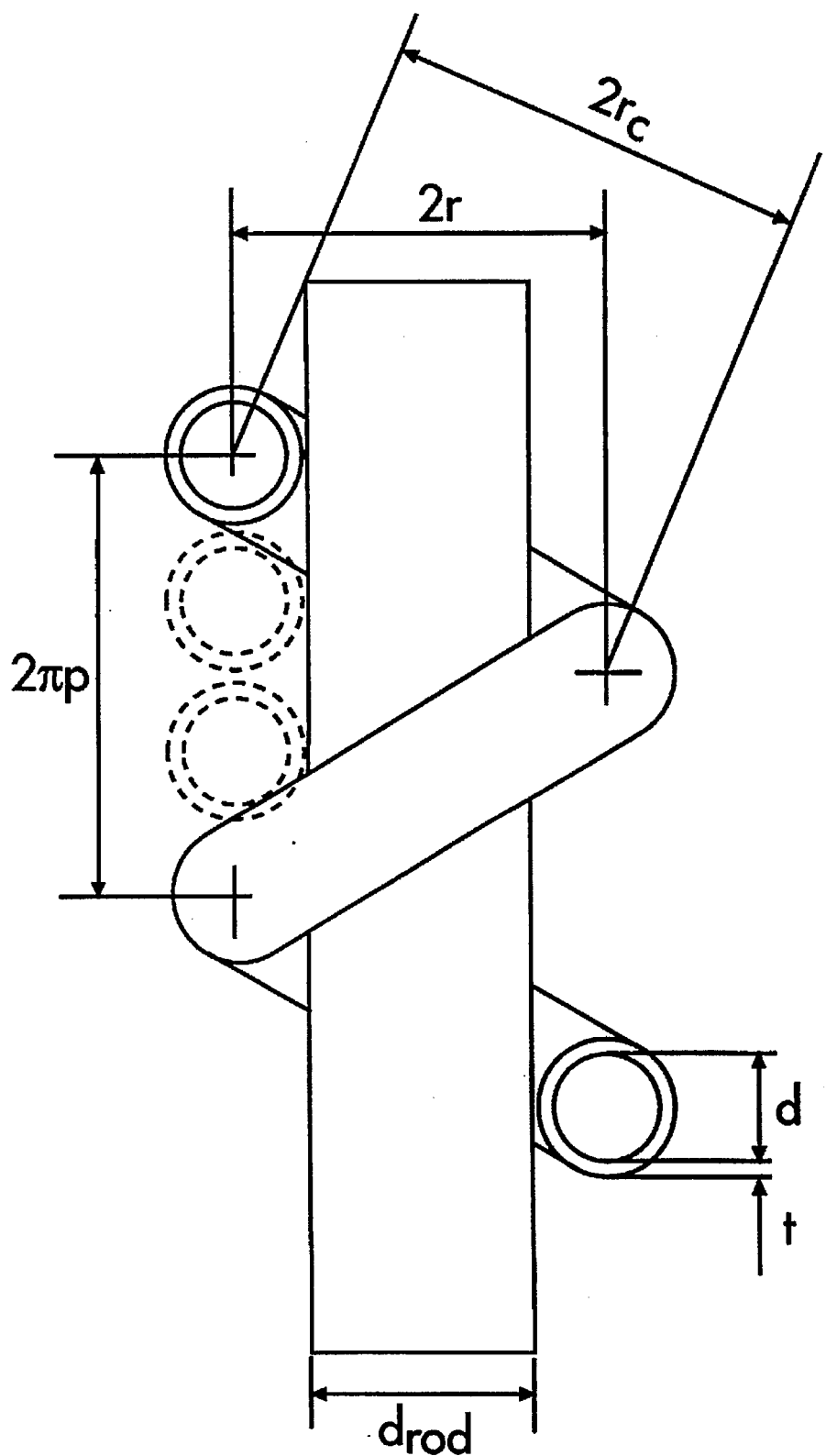
FIG. 2 is a schematic illustration of the geometry of a helical tube used in accordance with the present invention.

The relation between the critical Dean number and the critical Reynolds number is given by:

$$De_c = Re_c \sqrt{\frac{d}{k}} \qquad (2)$$

where $k=(r_o+r_i)/2$ and $d=r_o-r_i$, the inner diameter of the tube. To consider the different radii of a circle and a spiral we used the radius of curvature given by Germano, M., "The Dean equations extended to a helical pipe flow", J. Fluid Mech. 203 (1989) 289–305.

$$r_c = \frac{r^2 + p^2}{r} \qquad (3)$$

where $$r = d_{rod}/2 + t + d/2 \qquad (4)$$

$$p = \frac{m}{2\pi}(d+2t) \qquad (5)$$

with t the wall thickness of the tube (membrane and m the number of tubes lying next to each other (see FIG. 2).

Using the definition for the radius of curvature, we obtain $$r_c/d = (1/2)\frac{1-\eta}{1+\eta} \qquad (6)$$

Substituting Eqs. (4) and (5) into (3) and then (3) into (6), we obtain $$\eta = \frac{2\left(\left(\frac{d_{rod}}{2}+t+\frac{d}{2}\right)^2+\frac{m^2}{4\pi^2}(d+2T)^2\right) - d\left(\frac{d_{rod}}{2}+t+\frac{d}{2}\right)}{2\left(\left(\frac{d_{rod}}{2}+t+\frac{d}{2}\right)^2+\frac{m^2}{4\pi^2}(d+2t)^2\right)+d\left(\frac{d_{rod}}{2}+t+\frac{d}{2}\right)} \qquad (7)$$

This equation is examined below.

Figure 3:
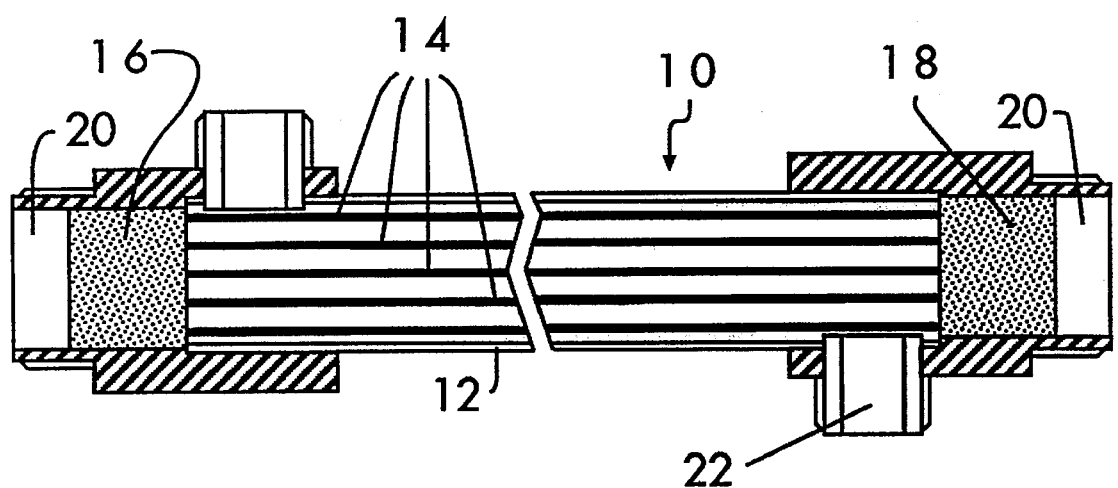
FIG. 3 is a schematic sectional view of a linear multi-tube design used to help verify the effectiveness of the present invention.
Figure 4:
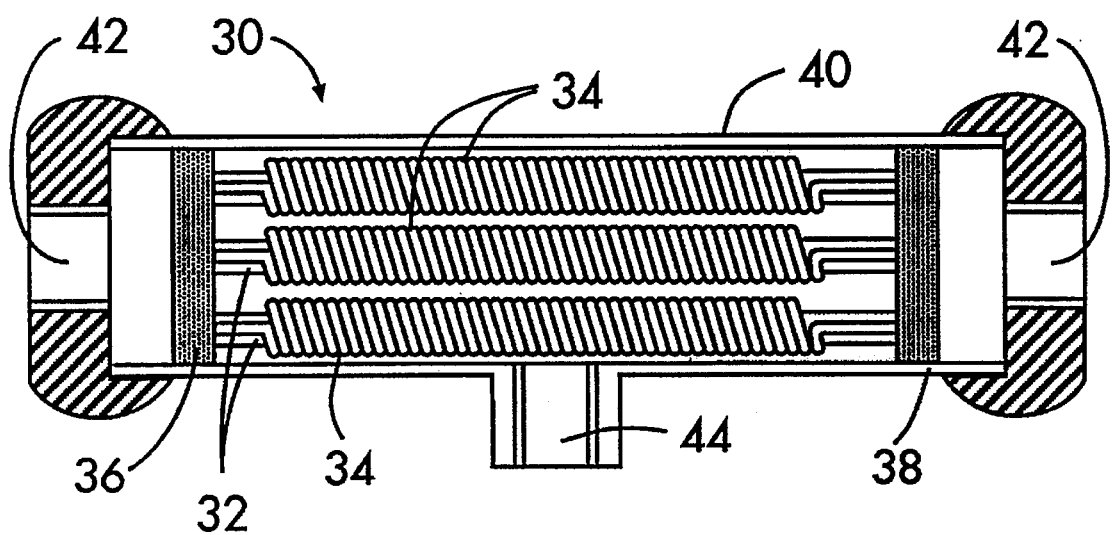
FIG. 4 is a sectional schematic view of a wrapped multi-tube hollow fiber design used to confirm the effectiveness of the present invention.
Figure 5:
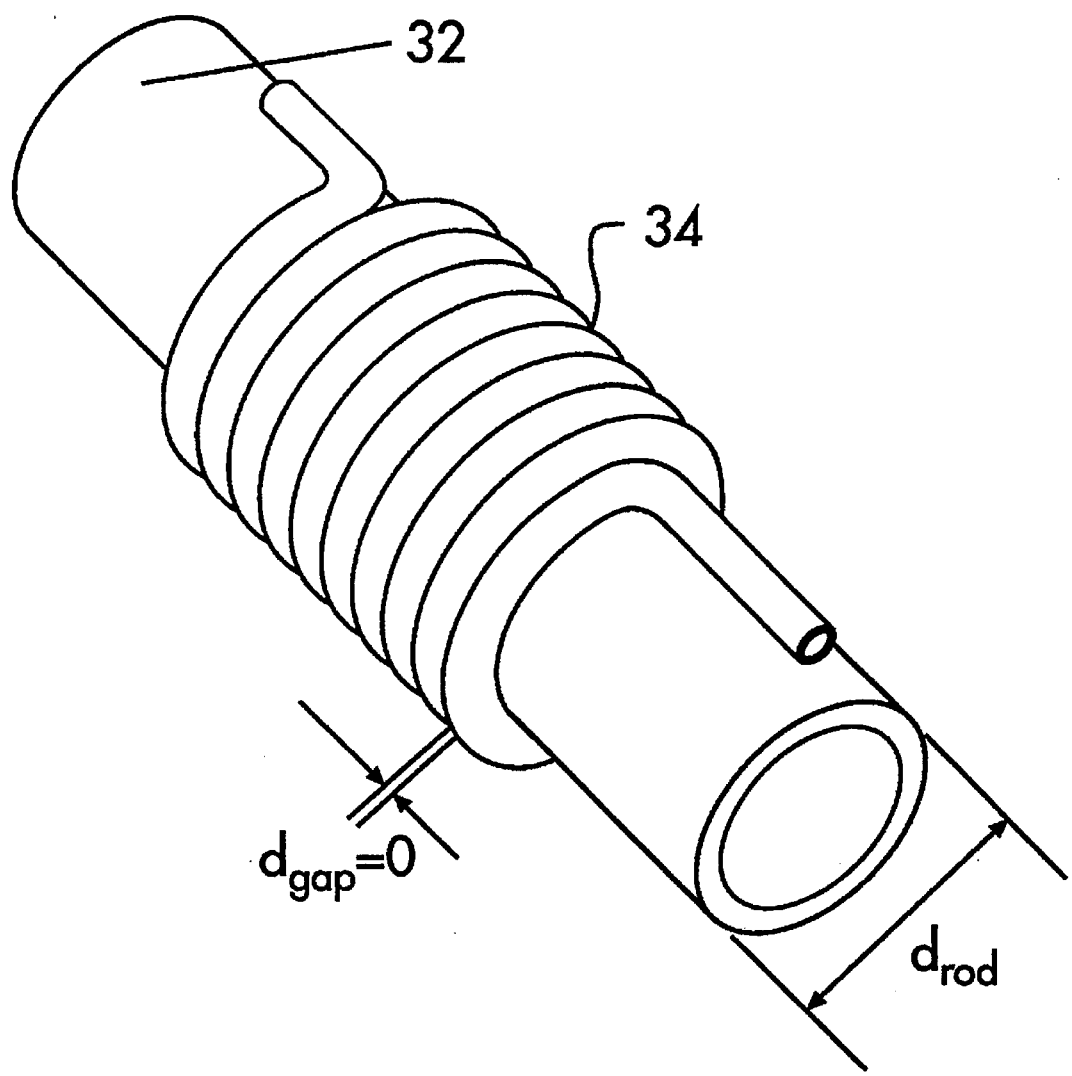
FIG. 5 is an enlarged detail from FIG. 4.

Two hollow fiber membrane modules were designed and built so as to compare the difference in performance for nanofiltration in the presence and absence of vortices. The first module, a linear tube design 10 in FIG. 3, contained 26 straight hollow fibers 12 sealed at sealant 16,18, inside a CPVC outer shell 14. Inlets 20 supply feed to the tubes and also act as outlets. A permeate outlet 22 is also provided. The second module, a spiral tube design 30 in FIGS. 4 and 5, also contained 26 rods 32 each of which was wrapped with a hollow fiber 34 in a spiral configuration. The hollow fibers and the rods were sealed at both ends 36,38 of a plastic outer shell 40. A feed inlet/outlets 42 and permeate outlet 44 are connected to shell 40. The tube need not be wound on a rod, however, and still be within the present invention.

The linear tube module 10 has an overall length of 815 mm and a diameter of approximately 90 mm. The active fiber length was 790 mm and the surface area was 147 $cm^2$. There was one outlet 22 for permeate collection. The rods 32 of module 30 had a diameter of 3.175 mm and the fibers 34 were wrapped tightly around them. Because of the larger cross-section of the spiral tube module 30, the outer fittings of the shell 40 were unable to withstand the maximum operating pressure of 280 kPa. To protect them from bursting, a clamp made of two metal plates of 10×10 cm and four screw rods was installed to embrace the module. For simplicity and reproducibility, a constant rod diameter was chosen for all rods. However, since the feed flow rate decreased through the module and, therefore, the velocity of the fluid also decreased, the vortices could weaken and even disappear towards the outlet of the module. According to the invention, one always tries to operate so that the Reynolds number (or flow rate) is greater than the critical Reynolds number (or critical flow rate).

The smallest diameter, $d_{rod}$ that the fibers could be wrapped around without damaging them was found to be 3 mm.

For optimization of η and to obtain the best performance in a spiral tube module, the ratio of the highest Dean number possible and the critical Dean number should be maximized, i.e., $$\max D = De/De_c = Re/Re_c. \tag{8}$$

Since the maximum flow rate (or maximum Dean number) was limited by a maximum pressure drop of 280 kPa in the spiral tube module, it was decided to decrease the critical Reynolds number and hence η according to FIG. 1. This would allow us to maximize De.

To determine the optimal design of a spiral tube module, we plotted η from Eq. (7) versus the inner diameter of the hollow fiber d and the diameter of the rods, $d_{rod}$. The smaller $d_{rod}$ and the number of fibers wrapped around a rod, the more one can reduce η. A larger diameter of the hollow fiber would also cause η to decrease. However, such a fiber would be weaker and, hence less, pressure resistant. Therefore, the maximum pressure drop and the maximum flow rate would also decrease.

The smallest diameter, $d_{rod}$, that the fibers could be wrapped around without damaging them was determined, as noted above, and was found to be 3 mm.

Calculations for critical Reynolds number and critical Dean number follow. Given the dimensions of the hollow fibers ($d_j$=0.270 mm, t=0.175 mm), and of the rods ($d_{rod}$=3 mm), we obtain from Eq. (7) η=0.867. From Eq. (1), we obtain $Re_c$=45.89, and from Eq. (3) we get $r_{ic}$=1.77 mm, and $r_{oc}$=2.04 mm.

Therefore, we find from Eq. (2) $De_c$=17.28.

Calculations of critical velocity and critical feed flow rate follow. Dean numbers and Reynolds numbers were measured indirectly from the volumetric flow rate through the modules. A constant flow rate was considered negligible compared to the feed flow rate. The critical volume flow through one hollow fiber is given by $$Q_{c\text{-}fiber} = \frac{\pi}{2} d^2 v_c \tag{9}$$

where $v_c$, the critical velocity, is given by $$v_c = \frac{Re_c \mu}{d \cdot \rho} \tag{10}$$

where, for water, the viscosity μ=9.855 $10^{-3}$ kg/m-s and the density ρ=1000 kg/m³ at 25° C. Thus, $v_c$=0.0145 m/s $Q_{c\text{-}fiber}$=8,32 $10^{-6}$ dm³/s or for 26 fibers, $Q_c$=26 $Q_{c\text{-}fiber}$=2.16 $10^{-4}$ dm³/s=12.98 ml/min for the critical volumetric flow rate through each module.

Maximum Dean ratio is obtained from Eq. (8); the maximum Dean ratio $D_{max} = De_{max}/De_c = Re_{max}/Re_c = v_{max}/v_c = Q_{max}/Q_c$ For the spiral tube module, the maximum volumetric flow rate for salt solutions and silica suspensions were determined experimentally as $D_{max\text{-}salt\,solution}$=13.1 and $D_{max\,silica\,suspensions}$=11.6.

Multiple hollow fibers were installed in each module so as to average out the differences of each single fiber. The hollow fiber membranes had an inner diameter of 0.270 mm and an outer diameter of 0.620 mm. The support material was made of polyethersulfone, the coating consisted of an interfacially polymerized polyamide. See S. McCray, (Oct. 24, 1989), U.S. Pat. No. 4,876,009, "Tetrakis-amido high flux membranes". They were specifically made for nanofiltration with a temperature range of 0°–60° C. and a pH range of 3–9. The average burst pressure was 320 kPa.

Figure 6:
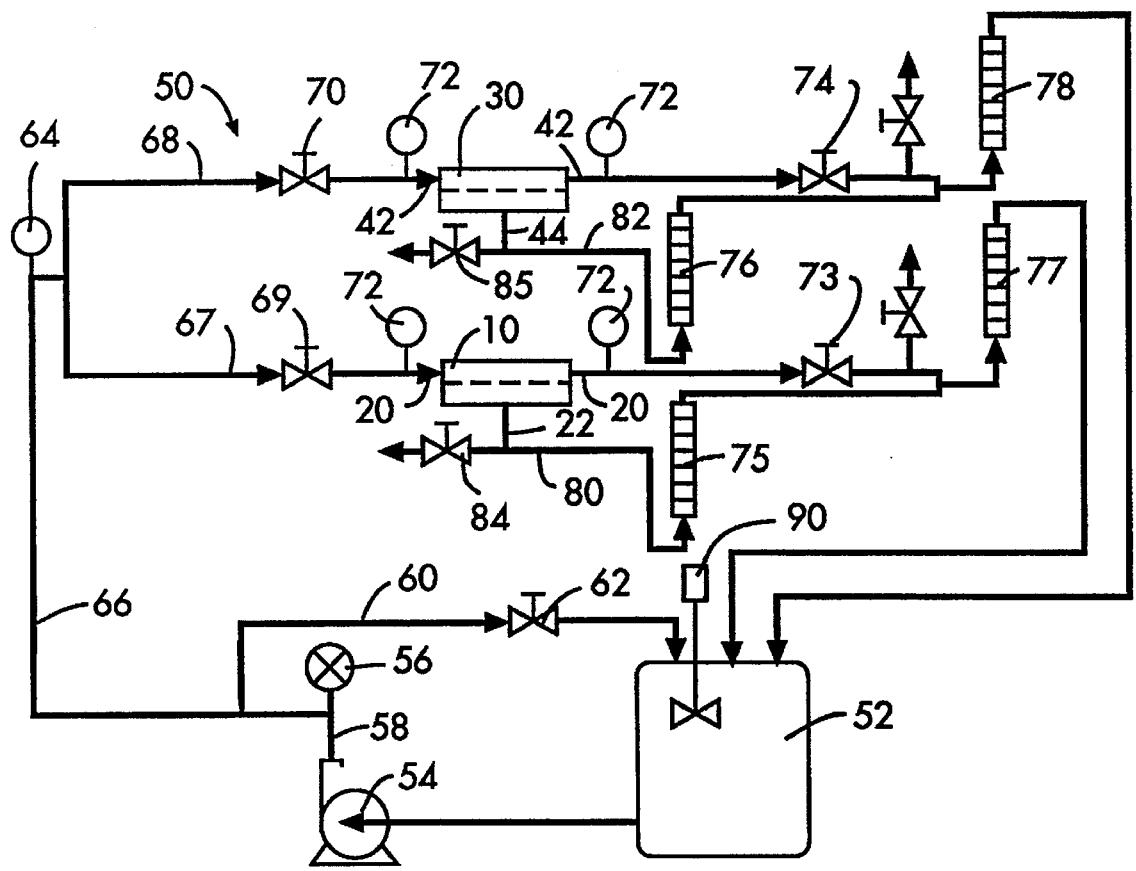
FIG. 6 is a schematic diagram of the experimental system used to confirm the present invention.

To assure similar conditions of temperature, feed solution etc., during the testing of the two modules, an experimental system was designed to operate both the spiral tube module 30 and as a reference, the linear tube module 10, simultaneously. The experimental system is depicted at 50 in FIG. 6. It consisted of a 19.5 l Nalgene tank 52, a diaphragm pump 54 (Wanner Hydracell, N.Y., Mod#M 03) driven by a variable speed electric motor (Baldor, N.Y., Mod#CDP 3330) and regulated by a controller (SECO, N.Y., Mod#160SRC) and the two membrane modules.

A large volume reservoir in the form of tank 52, was used to reduce pulsation of the fluid within the experimental apparatus and to avoid temperature increases due to the pump and a mixer in the system. The remaining pulsation was dampened by a pulsation dampener 56 (Cat Pump, Mod#6029) and installed in the discharge line of the pump 54 as close to the membrane modules as possible. The dampener was precharged with 133 kPa (195 psi) 0.5 times the maximum inlet pressure of the modules. For this reason it started working efficiently at 136 kPa (200 psi). The pump and dampener were connected via a flexible metal hose 58 (0.5" Swagelok, length 900 mm, 316SS). The pump was able to generate a pressure of up to 680 kPa (1000 psi). The pressure produced during the course of the experiment was much less than this, up to 270 kPa. Since the minimum flow rate of the pump 104 ml/min, was higher than that required for our experiments and because the pump ran very roughly at low flow rates, a bypass line 60 with a needle valve 62 (Swagelok, N.Y., Mod#SS-3NRS4) was installed and operated with the pump mostly at 800 ml/min (i.e., 40% at the controller scale). The temperature of the feed was measured by a temperature gauge 64 (thermocouple) on line 66, just after the pulsation dampener.

After the bypass line, the feed flow was divided into two parallel lines 67, 68 with the same cross-section, one for each module. It was also possible to operate the modules separately by closing ball valves 69 and 70 (Swagelok, N.Y., Mod#SS-42S4) installed at the beginning of each line. The inlet pressure of the modules, the transmembrane pressure and the pressure drop over the modules was measured with pressure gauges 72 (McMaster Carr, Mod#4088k999), monel body, glycerine filling). They were located at the inlet and the outlet of each module. The feed flow rate through the modules and the outlet pressure were controlled by a regulating (back-pressure) valve 73, 74 (Swagelok, Mod#SS-MS4-VH) downstream of each module. The permeate streams passed through flowmeters 75, 76 (Gilmont, Mod#GF1200) to determine the concentrate and the permeate streams were well mixed before entering the tank 52. Moreover, it was easier to obtain the feed flow rates without needing to add the concentrate to the permeate flow rates. The feed flow rates were measured with two flowmeters 77, 78 (Gilmont, Mod#GF2360) before the streams returned to the tank. By measuring the feed flow rates in the low pressure segment of the system, the cost for the flowmeters was decreased significantly. To take samples of the permeate and concentrate streams of each module, a sample line 80, 82 was added to each stream and closed with a valve 84, 85. All connection and fittings upstream the resulting valves were made of ½" and ¼" 316 stainless steel tubing and stainless steel fittings (Swagelok). Downstream of the regulating valves 73, 74, 3/16" plastic tubing and plastic fittings were used. To keep the feed solution in the reservoir homogeneous, a mixer 90 was installed and operated during the experiments approximately every 5 minutes for a duration of 3 minutes.

To examine the potential of Dean vortices to prevent concentration polarization and membrane fouling, the spiral tube module and the linear tube module were tested simultaneously with different salt solutions and silica suspensions containing salts.

The liquid requirements for all experiments was ultraclean water. This water was produced by passing tap water through a carbon filter, an RO unit (Filmtech, Minneapolis, Minn., Model#FT30), ion exchangers and UV sterilizer. The resistivity of the ultraclean water was continuously checked by a conductivity meter and was always between 18 and 19 Megohm/cm. Although the resistivity is only an indicator for inorganic impurities, the organic impurities were considered to be very low, due to the carbon filter, the RO unit and the UV sterilizer.

For the salt solutions, magnesium sulfate ($MgSO_4$) was used; the silica suspensions were prepared with 20 μm silica particles (Degussa, Germany, Sipernat 22).

Four different suspensions were tested: 0,20,40 and 80 ppm silica (designated 1–4). Each of the suspensions was tested in combination with different salt solutions (called feed types): (1) with 1000 ppm, 1500 ppm and 2000 ppm $MgSO_4$; (2) and (3) with 1000 ppm and 2000 ppm $MgSO_4$; and (4) with 1000 ppm $MgSO_4$. The osmotic pressure for different molar $MgSO_4$ solutions is given below.

For each feed type, at least four different flow rates, each of them at four different inlet pressures, were tested. The flow rates were: 50,80,110,130,150 and 170 ml/min. The inlet pressures were chosen from 167 kPa (245 psi), 190 kPa (280 psi), 211 kPa (310 psi), 231 kPa (340 psi) and 252 kPa (370 psi). The low inlet pressures could not be obtained for the high flow rates (130 ml/min and up) since the pressure drop introduced by the spiral tube module was larger than the inlet pressure in these cases. An outlet pressure reading of at least 10 kPa (15 psi) was required to obtain reliable results.

Before starting the experiments, the reservoir was filled with 0–15 liters of ultraclean water. The weights of $MgSO_4$ and silica were measured with a Satorius (Germany, Model#K#4030) fine balance. While mixing the feed solution, the salt was added first and then the silica particles. The solution was mixed thoroughly for 10 min. After starting the pump, the first combination of inlet pressure and feed flow rate was set. It took about 80 min. to reach a steady state for the first pressure/flow combination, since the membrane modules were originally filled with ultraclean water. The readings for the following combinations of pressure/flow could be taken after 30 min., with less than 5% discrepancy from the steady state condition.

To establish a desired inlet pressure and a desired flow rate, the bypass valve was closed until the inlet pressure reached the desired value. Then, the feed flow rates were adjusted with the regulating values. Because of changes in the inlet pressure introduced by turning the regulating valves, several adjustments alternating between the bypass valve and the regulating valves were necessary to establish a steady pressure and steady flow rates.

Once a new combination of inlet pressure and feed flow rates had been installed, readings from the pressure gauges and flowmeters were taken every 3–5 min. Samples of the permeate streams were taken every 5–10 min. and their conductivity was measured (Conductivity meter, Cole Parmer). Samples from the concentrate streams were taken every 10–15 min. and their conductivity was also measured. Afterwards, the samples were flushed back into the tank. The conductivity of the feed solution was also checked regularly.

The pressure gauges were calibrated by the manufacturer with an accuracy of ±0.15%. The calibration of the flow meters was checked with a stop watch and weighed testtubes. The accuracy was ±1% for the permeate flow meters and ±2% for the feed flow meters. The conductivity meter was calibrated with two standard test solutions of 718 μS and 2070 μS provided by Cole Parmer.

After each day of experiments, the system and the membranes were rinsed with ultraclean water for 30 min. to flush salt molecules, silica and other particles out of the membranes. Next, a 0.05% citric acid solution was flushed through the system for 30 min. to dissolve metallic ions from the membranes. Then, a 30 min. cleaning step was performed with sodium hydroxide (NaOH) solution at pH 10.5. The increased pH let to an increased solubility of silica particles. Finally, the system was rinsed with ultraclean water for 4–6 hours. After experiments with silica suspensions, the third and fourth step had to be repeated for 4–10 times to remove coagulated silica particles from the membrane. The water permeabilities of the membranes were checked after each step. Once a week the membrane modules, tubing and fittings were disassembled and rinsed with pressurized ultraclean water.

While running experiments with silica suspensions, silica particles settled in the plastic tubing downstream of the regulating valves. The problem was solved by exchanging the ⅜" tubing with 3/16" tubing and therefore increasing the mean velocity in the tubes by a factor of about four times.

The osmotic pressure of magnesium solutions was calculated by the following approximation for a dilute solution:

$$\pi = \frac{RTM_A}{V_A} \, v \cdot m \cdot \phi \tag{11}$$

where R is the gas constant, T the absolute temperature, $M_A$ the molar weight of the solvent, $V_A$ the partial molal volume of the solvent, v the number of moles of ions formed from one mol of electrolyte, $\phi$ the molal osmotic coefficient and m the molality of the solute.

Both linear and spiral hollow fiber modules were tested for water permeability. The permeability for both modules was fond to be about 0.09 $1/(m^2\text{-hr-kPa})$, regardless of the Dean ratio.

Figure 7:
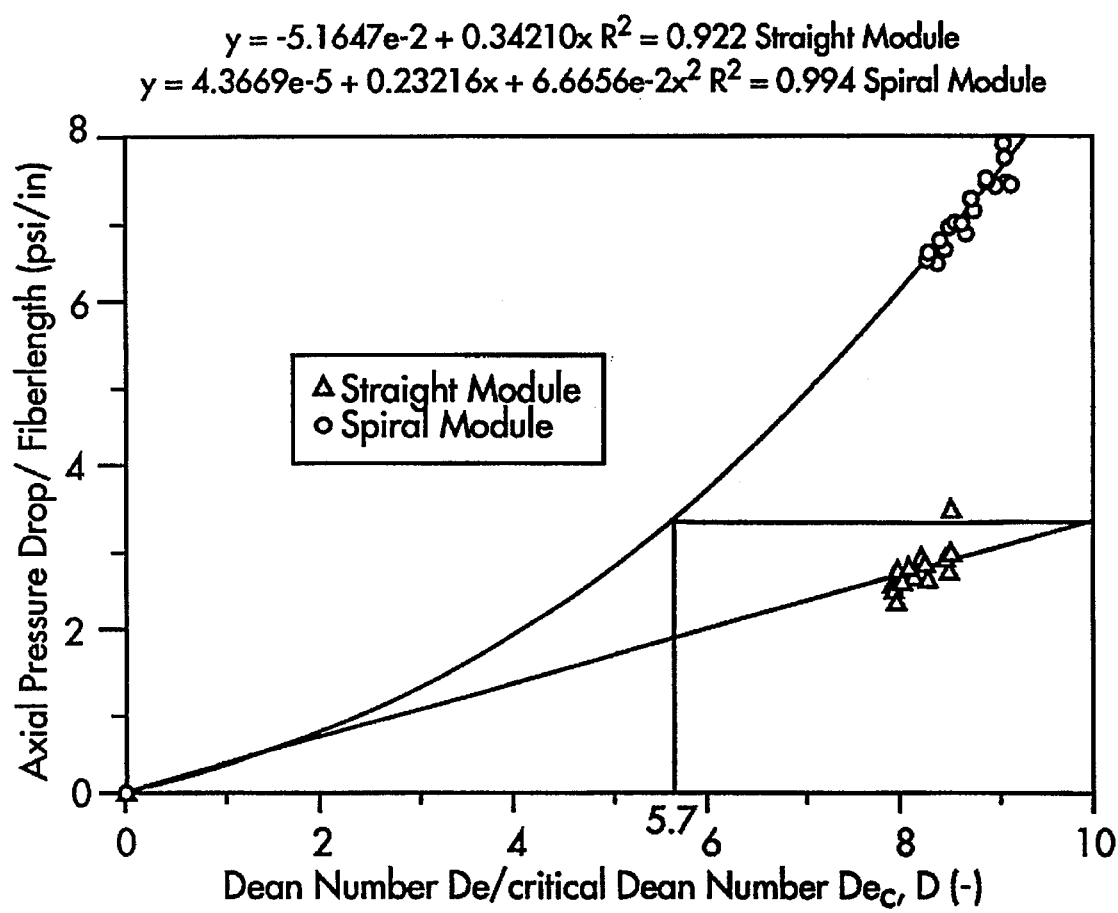
FIG. 7 is a graph which illustrates the axial pressure drop per unit length as a function of Dean number ratio with DI water as the feed.

The axial pressure drop in both modules was measured as a function of Dean ratio. The results are plotted in FIG. 7. The Hagen-Poiseuille equation holds for the linear module and hence, a straight line is obtained. Looking at the Navier-Stokes equations extended to helical flow, it can be seen that the axial pressure drop is a complex function of velocity of flow. At least one term in the equation for axial pressure drop contains the product of two velocity components. Also, Dean vortices are a centrifugal effect and centrifugal force is proportional to the square of the velocity. Based on these considerations, the axial pressure drop data for the spiral module are fitted with a quadratic equation. The excellent fit suggests that there is some truth to these observations. These results are similar to those obtained previously for a curved slit channel.

Performance characteristics of both modules were measured for the nanofiltration of $MgSO_4$ salt solutions. At low concentration (1000 ppm $MgSO_4$), several effects were observed: (i) there was a significant improvement in performance with Dean vortices; (ii) the flux improvement increased with increasing driving force for a given Dean number; and (iii) though it was not clearly seen at this concentration, the flux improvement increased with increasing Dean number.

Nanofiltration results with 1500 ppm $MgSO_4$ solutions showed the same effects. Increase in flux improvement with increasing Dean number was more clearly seen. The effect was even more pronounced as the concentration increased to 2000 ppm. Also, it was seen that the net improvement in flux increased with increasing concentration, even though the absolute fluxes decreased.

At low concentrations of solute, the flux improvement due to the Dean vortices was expected to be small. This was based on the water flux results. At very high concentrations the effectiveness of Dean vortices was reduced due to bulk viscosity effects. A maximum flux improvement will occur at an intermediate concentration.

Figure 8:
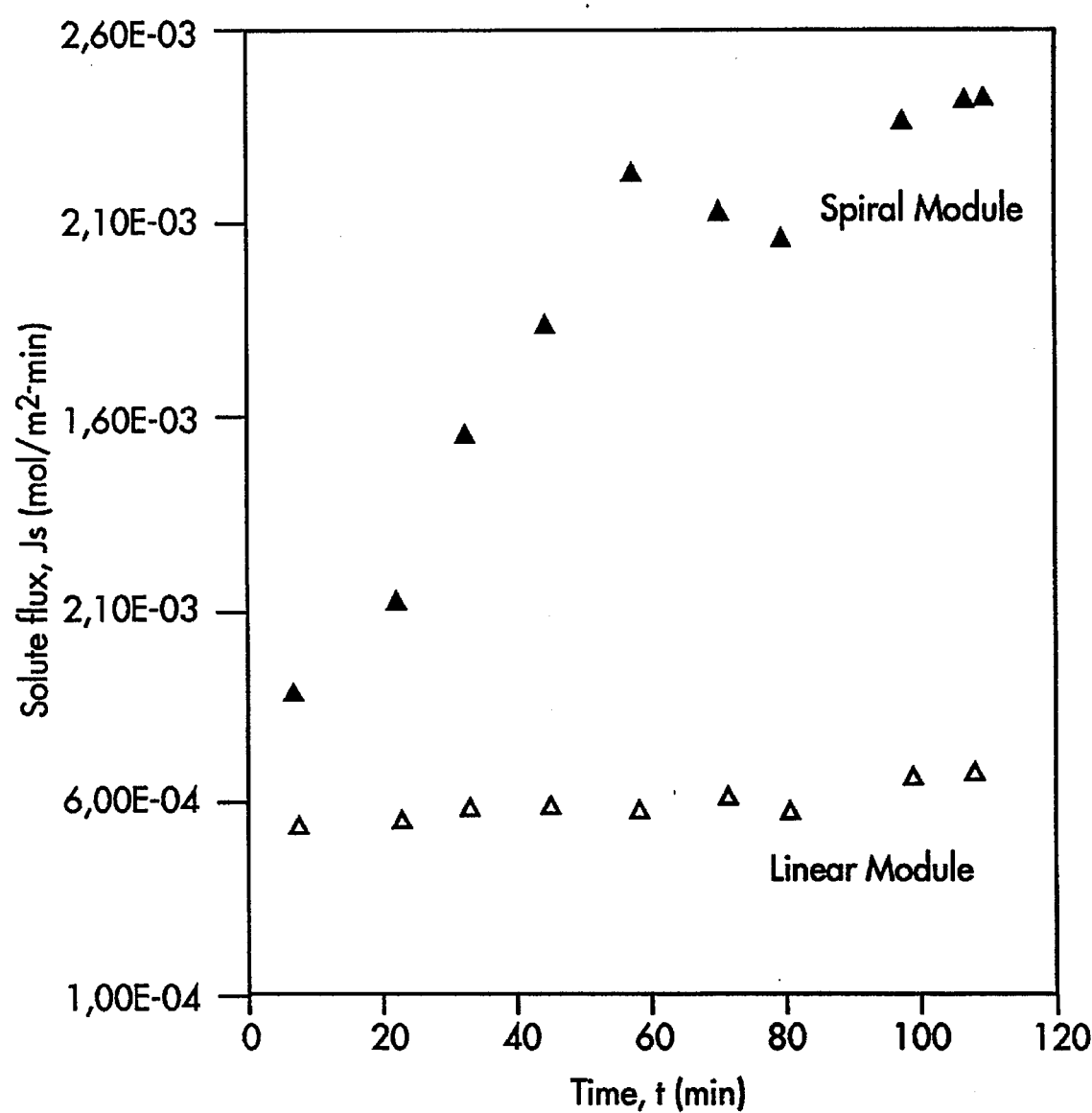
FIG. 8 is a graph showing solute flux of a salt solution containing $MgSO_4$ in the linear and spiral nanofiltration modules at transmembrane pressure of 1700 kPa, Dean ratio of 3.84 and temperature 298 K.
Figure 9:
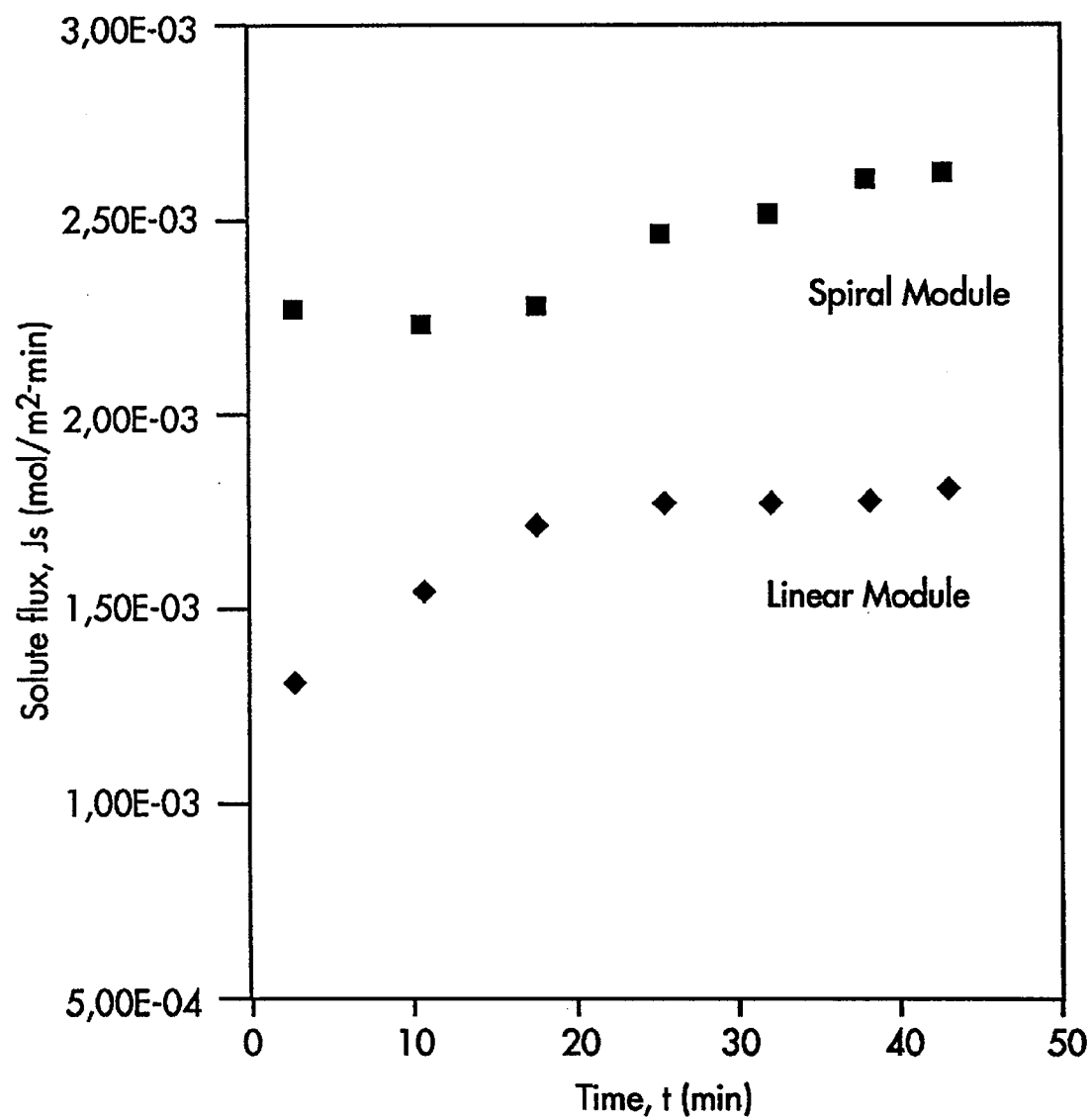
FIG. 9 is a graph similar to FIG. 8 where the concentration of $MgSO_4$ is changed from 1,000 ppm to 2,000 ppm, the pressure is increased to 1,800 kPa and Dean ratio is 7.69 at the same temperature of 289 K.
Figure 10:
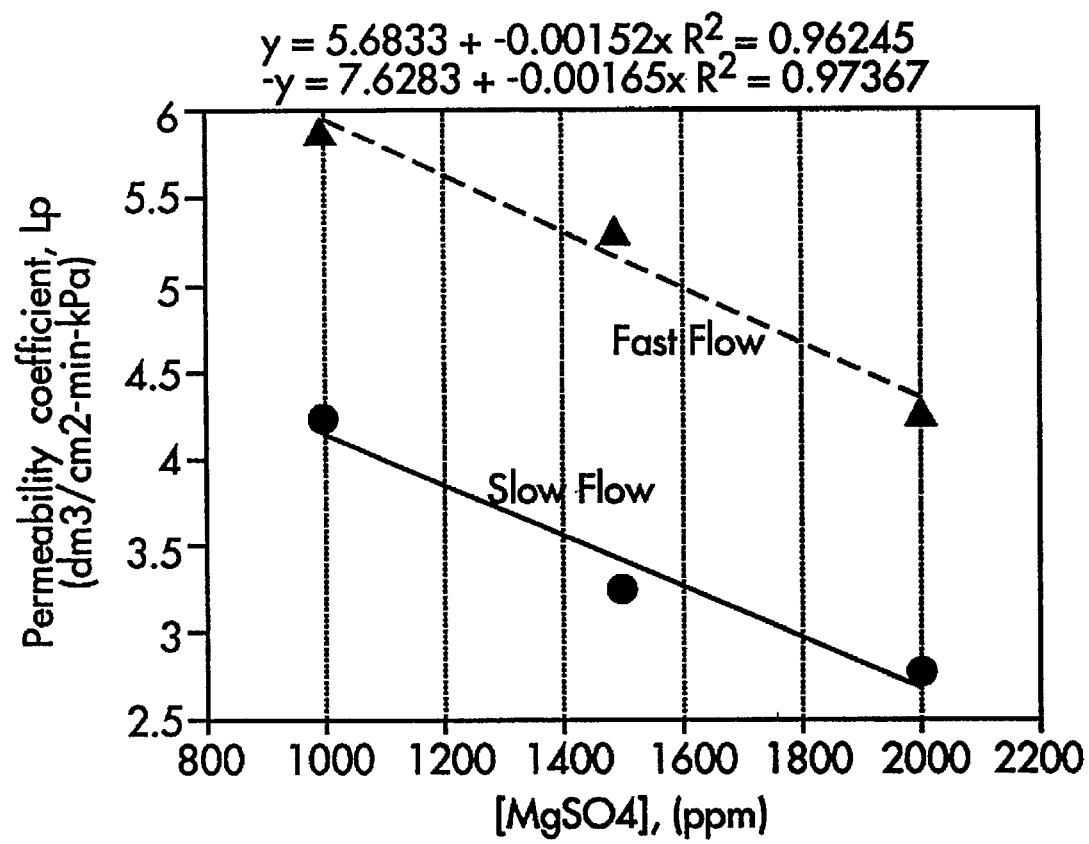
FIGS. 10, 11, 12 and 13, are graphs plotting permeability coefficients against solute or suspension concentrations, demonstrating the effectiveness of the present invention.
Figure 11:
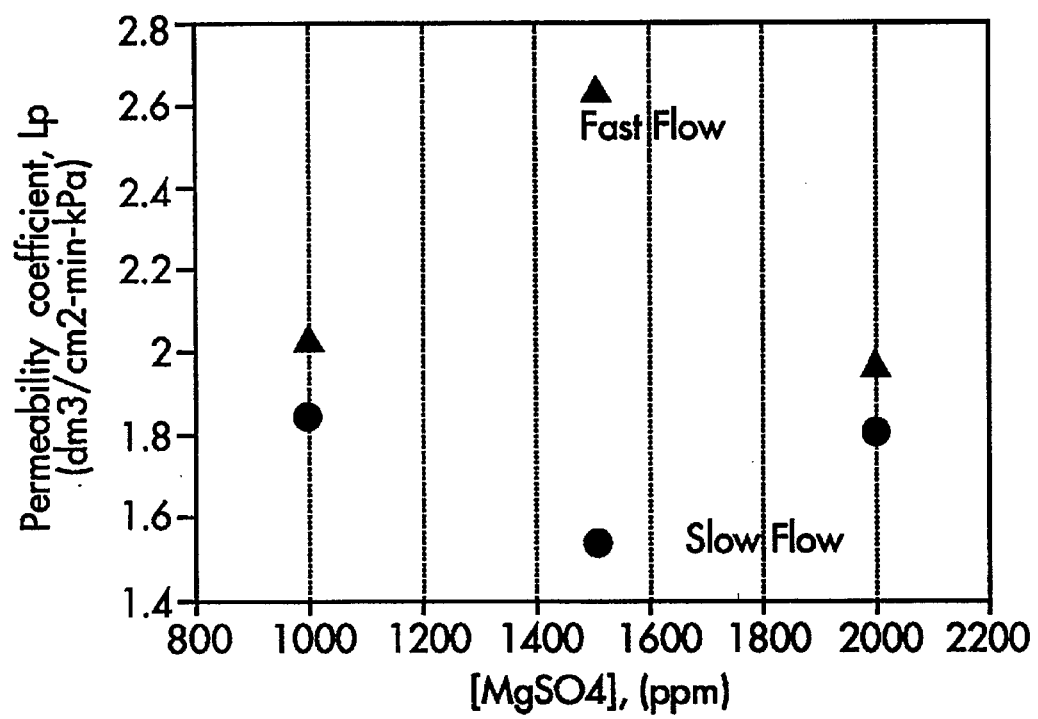
Figure 12:
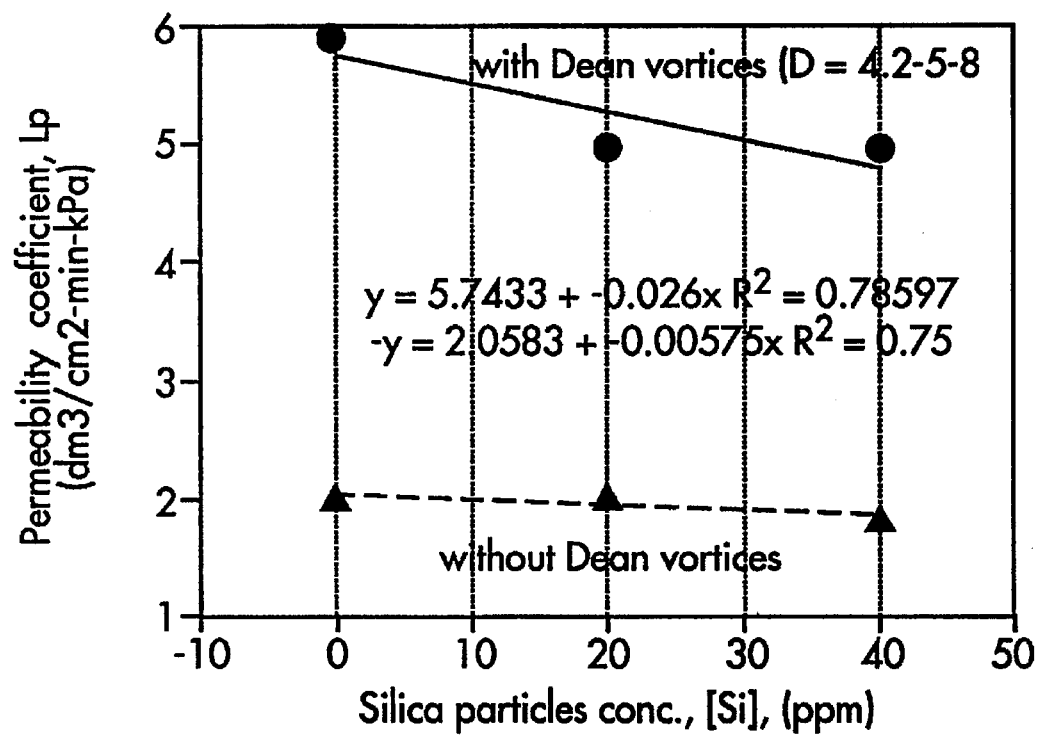
Figure 13:
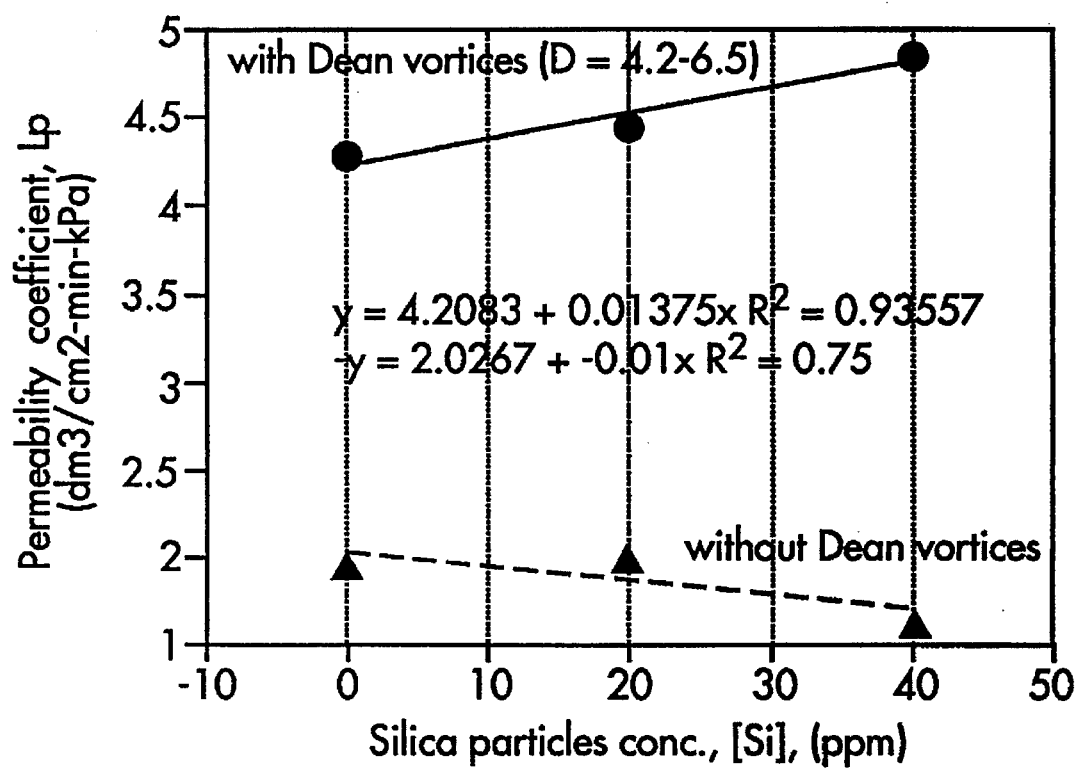

Sample solute flux plots are shown in FIGS. 8 and 9. The higher solute flux for the spiral module means a lower rejection. At least two competing effects contribute to this: (i) a lower solute flux due to vortex depolarization of the concentration boundary layer, and (ii) a higher solute flux due to increased permeation flux. Comparing FIGS. 8 and 9, it can be seen that increasing Dean number and solute concentration increased the effectiveness of vortex depolarization in reducing the solute flux. In other words, at higher concentrations and crossflow rates, the solute rejections is improved with presence of vortices.

The key consideration for a true performance comparison of the two modules is flux improvement with respect to energy consumption or axial pressure loss. The Reynolds numbers (or the equivalent Dean number ratio for the purpose of comparison) at which the flux results of both modules should be compared, can be obtained from FIG. 7. For example, the flux obtained without vortices at an equivalent Dean ratio of 10 should be compared with flux with vortices at a Dean ratio of 5.7. The flux at a Dean ratio of 10 driving force of 1900 kPa compared to flux at a Dean ratio of 3.84 (instead of 5.7) at the same driving force gives a conservative estimate of the flux improvement that can be achieved (about 35%). This clearly shows that for the same energy input the performance with Dean vortices is superior to that of the linear module. The effect is much more impressive as the concentration of solute is increased. An improvement of about 55% can be obtained.

The graphs of FIGS. 10, 11, 12 and 13, show the advantageous results of the invention. The following table tabulates these results to further demonstrate the advantages of the invention.

TABLE 1

Summary of data for flow with and without Dean Vortices[a]

| Flow Rate | Conditions | | | Permeability Coefficients[b] Slopes ($R^2$) × $10^8$ | | Salt Rejection[b] R | |
|---|---|---|---|---|---|---|---|
| | Dean ratio | $MgSO_4$ ppm | [Si] ppm | wdv ($dm^3/cm^2$-min-kPa) | wodv | wdv % | wodv |
| All | 1.9–6.5 | 0 | 0 | 20.6 (.912) | 7.1 (.901) | | |
| Slow | 1.9–4.2 | 1000 | 0 | 4.25 (.823) | 1.84 (.901) | 86–90 | 90–96 |
| Fast | 5.0–6.5 | 1000 | 0 | 5.90 (.990) | 2.02 (.712) | 85 | 89–92 |
| Slow | 1.9–4.2 | 1500 | 0 | 3.23 (.913) | 1.53 (.610) | 86–90 | 85–94 |
| Fast | 5.0–6.5 | 1500 | 0 | 5.31 (.877) | 2.63 (.958) | 86–89 | 89–91 |
| Slow | 1.9–4.25 | 2000 | 0 | 2.73 (.703) | 1.80 (.442) | 88–90 | 88–91 |
| Fast | 5.0–6.5 | 2000 | 0 | 4.25 (.832) | 1.96 (.974) | 87–90 | 89–92 |
| Slow | 1.4–2.0 | 1000 | 20 | 3.19 (.747) | 1.62 (8.30) | 85–90 | 75–81 |
| Fast | 4.2–5.8 | 1000 | 20 | 4.91 (.936) | 2.02 (.825) | 84–89 | 80–83 |
| Slow | 1.9–3.0 | 2000 | 20 | 3.88 (.887) | 1.85 (.958) | 89–92 | 82–85 |
| Fast | 4.2–5.8 | 2000 | 20 | 4.40 (.998) | 1.96 (.947) | 89–92 | 82–88 |
| Slow | 1.9–3.0 | 1000 | 40 | 3.88 (.945) | 1.56 (.901) | 88–90 | 75–82 |
| Fast | 4.2–5.8 | 1000 | 40 | 4.86 (.977) | 1.79 (.949) | 88–90 | 79–84 |
| Slow | 1.9–3.0 | 2000 | 40 | 3.53 (.958) | 1.17 (.864) | 89–91 | 81–85 |
| Fast | 4.2–5.8 | 2000 | 40 | 4.28 (.991) | 1.56 (.809) | 90–92 | 84–86 |

[a] Data for permeability coefficients and rejections are from linear best fit correlations in FIGS. 10–13.
[b] wdv = with Dean Vortices; wodv = without Dean Vortices.

Figure 14:
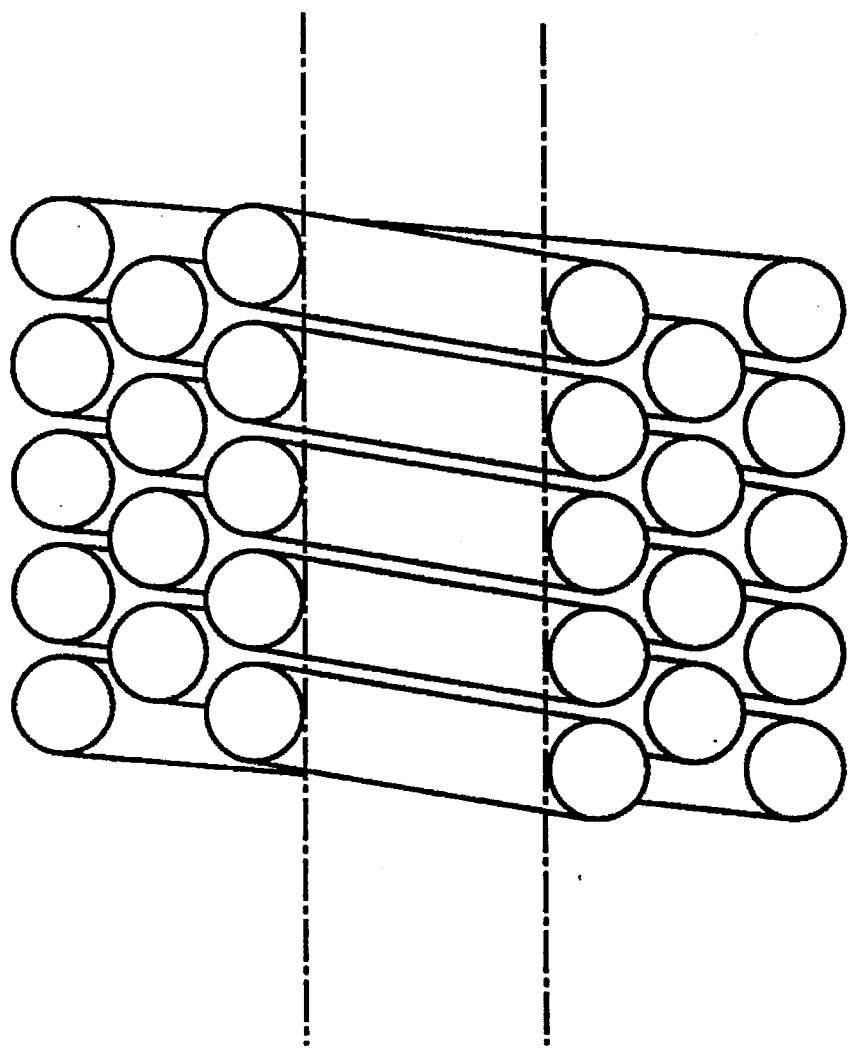
FIG. 14 is a schematic sectional view showing another embodiment of the invention with the coils of the windings progressing both axially and radially.

FIG. 14. shows an embodiment of the invention where the wound coils of the membrane tubes are wound to progress both axially and radially, much like string is wound on a bobbin.

Figure 15:
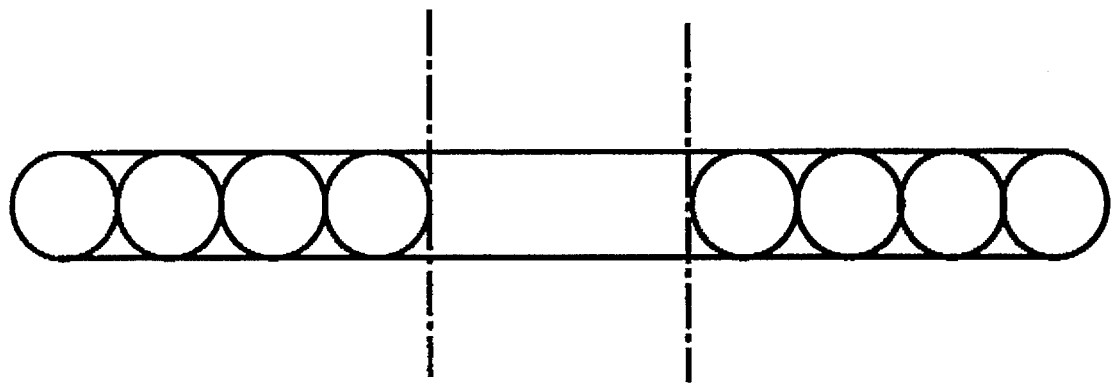
FIG. 15 is a view similar to FIG. 14 of a still further embodiment of the invention with the coils wound so that they progress radially.

FIG. 15 shows another embodiment of the invention where the membrane tube is wound to progress radially only, with each coil wound over the previous coil in the radially direction.

The following conclusions are made based on these results:

(i) The inventive design and construction of a spiral tubular nanofiltration element is effective in producing Dean vortices that depolarize and clean the membrane.

(ii) The presence of Dean vortices improves the performance of membranes significantly as compared to crossflow without Dean vortices.

(iii) The improvement in performance increased with increasing driving force, and with increasing solute ($MgSO_4$) concentration (for low concentrations).

(iv) Solute rejection increased for the spiral module with increasing Dean number and solute concentration.

(v) For the same energy consumption, the performance of the spiral module is superior by 35 to 55% to that of the linear module for relatively low salt concentrations. This is a crucial requirement for successful operation in a spiral device with Dean vortices.

While specific embodiments of the invention have been shown and described in detail to illustrate the application of the principles of the invention, it will be understood that the invention may be embodied otherwise without departing from such principles.

What is claimed is:

1. A method of defouling and depolarizing an inner surface of a hollow curved tubular membrane which comprises:

moving a fluid containing a component selected from the group consisting of a solute, solid particles and a mixture of a solute and solid particles to produce Dean vorticies in the fluid which move across said inner surface of said tubular membrane.

2. A method according to claim 1 wherein said curved tubular membrane comprises coils which progress axially.

3. A method according to claim 2 wherein there is little or no spacing between adjacent coils as they progress axially.

4. A method according to claim 1 wherein said curved tubular membrane comprises coils that are wound to progress both axially and radially.

5. A method according to claim 1, wherein said curved tubular membrane comprises coils that are wound to progress radially.

6. A method according to claim 1, including producing Dean vortices using a sufficiently high Dean number for cleaning the membrane and depolarizing a concentration polarization of the membrane without excessive pressure drop in the wound curved tubular membrane, and maximizing a ratio between the sufficiently high Dean number and a critical Dean number, the critical Dean number being a function of fluid flow rate, the inner diameter of the tube, the membrane thickness and a radius of a winding of the wound curved tubular membrane.

7. A method according to claim 6, including moving the fluid solution past the inner surface at a velocity greater than a critical velocity according to the equation $$v_c = Re_c \mu / d\rho,$$

where $Re_c$ is the critical Reynolds number for the fluid, $\mu$ is the viscosity of the fluid, d is the inner diameter of the curved tubular membrane and $\rho$ is the density of the fluid.

8. An apparatus for effecting a pressure-driven filtration process which comprises:

a hollow curved tubular membrane having a curved inner surface; and means for moving a fluid containing a component selected from the group consisting of a solute, solid particles and a mixture of a solute and solid particles to produce Dean vorticies in the fluid which move across said curved inner surface.

9. An apparatus according to claim 8, wherein the curved tubular membrane is a helical coil.

10. An apparatus according to claim 9, wherein the spiral coil is a helical coil and has turns which progress axially.

11. An apparatus according to claim 8, including means for moving the fluid past the membrane inner surface at a rate above a critical velocity according to the equation $$v_c = Re_c \mu / d\rho;$$

where $Re_c$ is the critical Reynolds number of the fluid, $\mu$ is the viscosity of the fluid, d is the inner diameter of the curved tubular membrane and $\rho$ is the density of the fluid.

12. The apparatus according to claim 8 wherein said curved tubular membrane comprises coils that are wound to progress both axially and radially.

13. The apparatus according to claim 8 wherein said curved tubular membrane comprises coils that are wound to progress radially.

* * * * *